(12) United States Patent
Dahn et al.

(10) Patent No.: US 11,217,817 B2
(45) Date of Patent: Jan. 4, 2022

(54) LITHIUM ION BATTERIES, ELECTRONIC DEVICES, AND METHODS

(71) Applicant: Umicore, Brussels (BE)

(72) Inventors: Jeffrey R. Dahn, Halifax (CA); Rajalakshmi Senthil Arumugam, Halifax (CA); Jens Paulsen, Daejeon (KR); Xin Xia, Cheonan (KR); Jing Zhang, Cheonan (KR)

(73) Assignee: Umicore, Brussels (BE)

( * ) Notice: Subject to any disclaimer, the term of this patent is extended or adjusted under 35 U.S.C. 154(b) by 166 days.

(21) Appl. No.: 16/303,081

(22) PCT Filed: May 5, 2017

(86) PCT No.: PCT/US2017/031232
§ 371 (c)(1),
(2) Date: Nov. 19, 2018

(87) PCT Pub. No.: WO2017/209895
PCT Pub. Date: Dec. 7, 2017

(65) Prior Publication Data
US 2019/0207246 A1    Jul. 4, 2019

Related U.S. Application Data

(60) Provisional application No. 62/343,828, filed on May 31, 2016.

(51) Int. Cl.
*H01M 10/0525* (2010.01)
*H01M 4/131* (2010.01)
(Continued)

(52) U.S. Cl.
CPC ........ *H01M 10/0525* (2013.01); *C01G 53/04* (2013.01); *C01G 53/44* (2013.01);
(Continued)

(58) Field of Classification Search
None
See application file for complete search history.

(56) References Cited

U.S. PATENT DOCUMENTS

| 6,218,048 B1 | 4/2001 | Manev et al. |
| 2002/0071991 A1* | 6/2002 | Kweon ................ H01M 4/131 |
| | | 429/231.1 |

(Continued)

FOREIGN PATENT DOCUMENTS

| CN | 103326018 A | 9/2013 |
| EP | 2 940 762 A1 | 11/2015 |

(Continued)

OTHER PUBLICATIONS

International Patent Application No. PCT/US2017/031232, filed May 5, 2017, International Preliminary Report on Patentability dated Dec. 4, 2018; 9 pages.

(Continued)

*Primary Examiner* — Robert S Carrico
(74) *Attorney, Agent, or Firm* — Mueting Raasch Group (57) ABSTRACT

A rechargeable lithium ion battery including: a positive electrode including coated particles, wherein each particle includes a core and a coating disposed thereon, wherein the core consists of Li, M, and O, and the coating includes Li, M, O, and Al2O3; wherein: M is $(Ni_z(Ni_{1/2}Mn_{1/2})_yCo_x)_{1-k}A_k$; $0.15 \leq z \leq 0.50$; $0.17 \leq x \leq 0.30$; $0.35 \leq y \leq 0.75$; $0 < k < 0.1$; $x+y+z=1$; and A includes Al and optionally at least one additional metal dopant selected from Mg, Zr, W, Ti, Cr, V, Nb, B, and Ca, and combinations thereof; and wherein the Li and M are present in the core in a molar ratio of Li to M of at least 0.95 and no greater than 1.10; a negative electrode; and a nonaqueous liquid electrolyte including: a lithium salt; a nonaqueous solvent; and an additive mixture including: prop-1-ene-1,3-sultone; at least one compound selected from tris(trimethylsilyl)phosphite, tris(trimethylsi- (Continued)

lyl)phosphate, tri-allyl phosphate, and combinations thereof; and at least one compound selected from methylene methanedisulfonate, 1,3,2-dioxathiolane-2,2-dioxide, and combinations thereof.

18 Claims, 6 Drawing Sheets

(51) Int. Cl.
  *H01M 4/525*    (2010.01)
  *H01M 10/0567*    (2010.01)
  *H01M 10/0569*    (2010.01)
  *H01M 4/36*    (2006.01)
  *C01G 53/04*    (2006.01)
  *C01G 53/00*    (2006.01)
  *H01M 4/505*    (2010.01)
  *H01M 10/48*    (2006.01)
  *H01M 4/02*    (2006.01)

(52) U.S. Cl.
  CPC ............ *C01G 53/50* (2013.01); *H01M 4/131* (2013.01); *H01M 4/366* (2013.01); *H01M 4/505* (2013.01); *H01M 4/525* (2013.01); *H01M 10/0567* (2013.01); *H01M 10/0569* (2013.01); *H01M 10/48* (2013.01); *C01P 2002/85* (2013.01); *C01P 2004/61* (2013.01); *C01P 2004/84* (2013.01); *H01M 2004/021* (2013.01); *H01M 2004/028* (2013.01); *H01M 2300/0037* (2013.01); *Y02T 10/70* (2013.01)

(56) References Cited

U.S. PATENT DOCUMENTS

| | | | |
|---|---|---|---|
| 2005/0074669 A1* | 4/2005 | Park | H01M 4/139 429/217 |
| 2011/0076556 A1 | 3/2011 | Karthikeyan et al. | |
| 2013/0175469 A1* | 7/2013 | Paulsen | C04B 35/62813 252/182.1 |
| 2014/0054495 A1* | 2/2014 | Paulsen | H01M 4/525 252/182.1 |
| 2017/0025706 A1* | 1/2017 | Dahn | H01M 10/0567 |

FOREIGN PATENT DOCUMENTS

| | | |
|---|---|---|
| KR | 20140006358 A | 1/2014 |
| WO | WO 2011/054441 A1 | 5/2011 |
| WO | WO 2013/148894 A1 | 10/2013 |
| WO | WO 2015/153716 A1 | 10/2015 |
| WO | WO 2016/116862 A1 | 7/2016 |

OTHER PUBLICATIONS

International Patent Application No. PCT/US2017/031232, filed May 5, 2017, International Search Report/Written Opinion dated Jul. 4, 2017; 12 pages.

Taiwan Patent Application No. 106117002 filed May 23, 2017; Office Action with Search Report dated Jan. 16, 2018. English language translation included. 12 pages.

Amine et al., "Mechanism of capacity fade of MCMB/Li$_{1.1}$[Ni$_{1/3}$Mn$_{1/3}$Co$_{1/3}$]$_{0.9}$O$_2$ cell at elevated temperature and additives to improve its cycle life", 2011, *J. Mater. Chem.*, 21:17754-17759.

Arumugam, et al., "Special Synergy between Electrolyte Additives and Positive Electrode Surface Coating to Enhance the Performance of Li[Ni$_{0.6}$Mn$_{0.2}$Co$_{0.2}$]O$_2$/Graphite Cells", *Journal of the Electrochemical Society*, Sep. 14, 2016, 163(13):A2531-A2538.

Bond et al., "Improving Precision and Accuracy in Coulombic Efficiency Measurements of Li-Ion Batteries", Jan. 23, 2013, *J. Electrochem. Soc.*, 160(3):A521-A527.

Burns et al., "Predicting and Extending the Lifetime of Li-Ion Batteries", Jul. 3, 2013, *J. Electrochem. Soc.*, 160(9):A1451-A1456.

Deshpande, et al., "The Limited Effect of VC in Graphite/NMC Cells", Dec. 16, 2014, *J. Electrochem. Soc.*, 162(3):A330-A338.

Ma, et al., "A systematic study of some promising electrolyte additives in Li[Ni$_{1/3}$Mn$_{1/3}$Co$_{1/3}$]O$_2$/graphite, Li[Ni$_{0.5}$Mn$_{0.3}$Co$_{0.2}$]/graphite and Li[Ni$_{0.6}$Mn$_{0.2}$Co$_{0.2}$]/graphite pouch cells", 2015, *Journal of Power Sources*, 299:130-138. Available online Sep. 5, 2015.

Ma, et al., "Ternary Electrolyte Additive Mixtures for Li-Ion Cells that Promote Long Lifetime and Less Reactivity with Charged Electrodes at Elevated Temperatures", Mar. 28, 2015, *J. Electrochem. Soc.*, 162(7):A1170-A1174.

Nie, et al., "Development of Pyridine-Boron Trifluoride Electrolyte Additives for Lithium-Ion Batteries", 2015, *J. Electrochem. Soc.*, 162(7):A1186-A1195.

Petibon, et al., "Electrolyte System for High-Voltage Li-Ion Cells", *Journal of the Electrochemical Society*, Sep. 17, 2016, 163(13):A2571-A2578.

Smith et al., "Precision Measurements of the Coulombic Efficiency of Lithium-Ion Batteries and of Electrode Materials for Lithium-Ion Batteries", Dec. 17, 2009, *J. Electrochem. Soc.*, 157(2):A196-A202.

Wang, et al., "A Systematic Study of Electrolyte Additives in Li[Ni$_{1/3}$Mn$_{1/3}$Co$_{1/3}$]O$_2$(NMC)/Graphite Pouch Cells", Aug. 23, 2014, *J. Electrochem. Soc.*, 161(12)A1818-A1827.

Wang, et al., "Supplemental Material for: A Systematic Study of Electrolyte Additives in Li[Ni$_{1/3}$Mn$_{1/3}$Co$_{1/3}$]O$_2$(NMC)/Graphite Pouch Cells", Aug. 23, 2014, *J. Electrochem. Soc.* 161(12)A1818-A1827.

Xia, et al., "Improving the long-term cycling performance of lithium-ion batteries at elevated temperature with electrolyte additives", 2015, *Journal of Power Sources* 287:377-385. Available online Apr. 18, 2015.

"What causes Lithium-ion to die?" *Battery University*, last updated on Sep. 22, 2014, Battery University, available online at <http://batteryuniversity.com/learn/article/what_causes_lithium_ion_to_die>. Retrieved online Sep. 12, 2016.

* cited by examiner

LITHIUM ION BATTERIES, ELECTRONIC DEVICES, AND METHODS

CROSS REFERENCE TO RELATED APPLICATIONS

This application is the § 371 U.S. National Stage of International Application No. PCT/US2017/031232, filed 5 May 2017, which claims the benefit of U.S. Provisional Patent Application No. 62/343,828, filed May 31, 2016, the disclosures of which are incorporated herein by reference in their entireties.

BACKGROUND

To adopt rechargeable (i.e., secondary) lithium ion battery technology into the automotive market, such as in a hybrid electric vehicle (HEV) and a plug-in hybrid electric vehicle (PHEV), there is strong and increasing demand for cathode material with improved properties, such as high energy density, long cycling life, and low price. Conventional rechargeable lithium ion batteries use $LiCoO_2$ (lithium cobalt oxide or "LCO") as cathode material, mainly in the aspect of portable electronic devices. There are limitations to applying LCO-containing batteries to the automotive market, particularly due to limited cobalt resources.

An alternative to LCO cathode material in a lithium ion battery (i.e., a full cell) is the so-called nickel manganese cobalt ("NMC") cathode materials, which are derivatives of LCO, where cobalt (Co) ions are partially substituted by more abundant transition metal ions such as nickel (Ni) and manganese (Mn). NMC cathode materials have roughly the stoichiometry $LiMO_2$, where $M=Ni_xMn_yCo_z$, and keep a similar ordered rock salt structure as that of LCO, where the cations order into 2-dimensional Li and M layers. NMC cathode materials possibly have many different compositions depending on the substitution level of Co by Ni and Mn. They can be categorized and named after their Ni, Mn, and Co content. Typical NMC-based materials include "NMC111" wherein $M=Ni_{1/3}Mn_{1/3}Co_{1/3}$, "NMC532" wherein $M=Ni_{0.5}Mn_{0.3}Co_{0.2}$, and "NMC622" wherein $M=Ni_{0.6}Mn_{0.2}Co_{0.2}$.

The NMC cathode material can roughly be understood as a solid state solution of $LiCoO_2$, $LiNi_{0.5}Mn_{0.5}O_2$, and $LiNiO_2$. For example, NMC622 can be understood as 0.2 $LiCoO_2$ +0.4 $LiNi_{0.5}Mn_{0.5}O_2$+0.4 $LiNiO_2$. In such materials, the higher Ni content of an NMC material, the lower the cost for achieving high energy density. Improving the energy density of the cathode is primordial in automotive applications. Thus, high Ni containing-NMC materials, like NMC622, by contrast to LCO, is more preferable for use in the large battery market.

Thus, the use of NMC materials with a high Ni content, including for example NMC 622, have to stably work under a voltage above 4.2 volts (V). Also, batteries in the automotive industry usually work at an elevated temperature above 40° C. Thus, NMC cathode materials with a high Ni content have to perform stably under such temperatures. This type of cathode material, however, presents several issues of unsatisfactory stability at elevated voltages (above 4.2V) and high temperatures (above 40° C.), including serious gas generation in full cells, which can result in poor battery cycle life, poor storage stability, and safety concerns.

Although attempts to reduce the gas formation and improve cycle life of high Ni NMC/graphite full cells include modifying high Ni NMC materials by surface modification or doping, and changing the electrolyte components, there is still a need for a rechargeable lithium ion battery that possesses the electrochemical properties required for automotive applications.

SUMMARY OF THE DISCLOSURE

The present disclosure provides rechargeable lithium ion batteries and electronic devices that include such batteries, as well as methods of improving the performance of rechargeable lithium ion batteries.

In one embodiment, a rechargeable lithium ion battery is provided. The battery includes: a positive electrode; a negative electrode; and a nonaqueous liquid electrolyte. The positive electrode includes coated particles, wherein each particle includes a core and a coating disposed thereon, wherein the core consists of Li, M, and O, and the coating includes Li, M, O, and $Al_2O_3$; wherein: M is $(Ni_z(Ni_{1/2}Mn_{1/2})_yCo_x)_{1-k}A_k$; $0.15 \leq z \leq 0.50$; $0.17 \leq x \leq 0.30$; $0.35 \leq y \leq 0.75$; $0 < k \leq 0.1$; $x+y+z=1$; and A includes Al and optionally at least one additional metal dopant selected from Mg, Zr, W, Ti, Cr, V, Nb, B and Ca, and combinations thereof; and wherein the Li and M are present in the core (or in the entire particle) in a molar ratio of Li to M of at least 0.95 and no greater than 1.10. The nonaqueous liquid electrolyte includes: a lithium salt; a nonaqueous solvent; and an additive mixture. The additive mixture includes: prop-1-ene-1,3-sultone; at least one compound selected from tris(trimethylsilyl)phosphite, tris(trimethylsilyl)phosphate, tri-allyl phosphate, and combinations thereof; and at least one compound selected from methylene methanedisulfonate, 1,3,2-dioxathiolane-2,2-dioxide, and combinations thereof.

Such rechargeable lithium ion batteries can be used in a variety of electronic devices, such as, for example, a portable computer, a tablet, a mobile phone, an electrically powered vehicle, and an energy storage system. In certain embodiments, the electronic device is an electrically powered vehicle.

In one embodiment, a method of improving the performance of a rechargeable lithium ion battery is provided. Such method includes: providing coated particles, each of which includes a core and a coating disposed thereon; forming the coated particles into a positive electrode; providing a negative electrode; providing a nonaqueous liquid electrolyte; and forming a rechargeable lithium ion battery comprising the positive electrode, negative electrode, and electrolyte. The core includes Li, M, and O, and the coating includes Li, M, O, and $Al_2O_3$; wherein: M is $(Ni_z(Ni_{1/2}Mn_{1/2})_yCo_x)_{1-k}A_k$; $0.15 \leq z \leq 0.50$; $0.17 \leq x \leq 0.30$; $0.35 \leq y \leq 0.75$; $0 < k \leq 0.1$; $x+y+z=1$; and A includes Al and optionally at least one additional metal dopant selected from Mg, Zr, W, Ti, Cr, V, Nb, B and Ca, and combinations thereof; and wherein the Li and M are present in the core (or in the entire particle) in a molar ratio of Li to M of at least 0.95 and no greater than 1.10. The nonaqueous liquid electrolyte includes: a lithium salt; a nonaqueous solvent; and an additive mixture. The additive mixture includes: prop-1-ene-1,3-sultone; at least one compound selected from tris(trimethylsilyl)phosphite, tris(trimethylsilyl)phosphate, tri-allyl phosphate, and combinations thereof; and at least one compound selected from methylene methanedisulfonate, 1,3,2-dioxathiolane-2,2-dioxide, and combinations thereof.

In certain embodiments, improving the performance of the battery results in a battery having at least one of the following: a retained capacity of less than 10% reduction after 80 cycles according to the Cycle-Store Test of Full Cell; and a coulombic efficiency of greater than 0.998% after 16 cycles according to the Full Cell Test by Ultra High-Precision Charger.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" in dicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides rechargeable (i.e., secondary) lithium ion batteries (i.e., full cells) with improved electrochemical performance, particularly at high voltage (greater than 4.2 volts, such as 4.35 V). Such lithium ion batteries include a positive electrode (i.e., a cathode) with surface-modified lithium (Li) nickel (Ni) manganese (Mn)

cobalt (Co) oxide that works with a negative electrode and a nonaqueous liquid electrolyte.

The positive electrode is made using coated particles, each of which includes a core and a coating disposed thereon, wherein the core consists of Li, M, and O, and the coating includes Li, M, O, and $Al_2O_3$. In both the core and the coating, M is $(Ni_z(Ni_{1/2}Mn_{1/2})_yCo_x)_{1-k}A_k$ (formula I). The coated particles of the positive electrode possess improved stability under high voltage cycling, thereby allowing them to be candidate cathode materials for automotive applications.

The nonaqueous liquid electrolyte includes: a lithium salt; a nonaqueous solvent; and an additive mixture. The additive mixture includes: prop-1-ene-1,3-sultone; at least one compound selected from tris(trimethylsilyl)phosphite, tris(trimethylsilyl)phosphate, tri-allyl phosphate, and combinations thereof; and at least one compound selected from methylene methanedisulfonate, 1,3,2-dioxathiolane-2,2-dioxide, and combinations thereof.

Utilization of this electrolyte additive mixture improves the cycling performance of full cells that include the positive electrode described herein. For example, this combination has an improved cycling stability during cycling in the voltage range of 2.8 V to 4.4 V at an elevated temperature of 40° C., when compared with full cells containing the same cathode material but an electrolyte without the additive mixture. Full cells containing the positive electrode and electrolyte, with additive mixture as described herein, possess high stability in high temperature-cycling and low-gas generation during formation of cells. Thus, such rechargeable lithium ion batteries described herein are stable under high voltage conditions. This can be a solution to reduce capacity fading and enhance the stability of full cells in automotive applications.

Although not intending to be bound by theory, it is believed that the addition of the additive mixture in the electrolyte and the positive electrode described herein together prevent side reactions and gas generation in the full cell. A typical electrolyte salt such as $LiPF_6$ tends to decompose and form side-products at high voltage, such as HF, which results in a reaction with the soluble base content on the surface of the positive electrode, and might also attack active particles of the positive electrode. The additive mixture in the electrolyte may modify or impact the passivation layer on the surface of the particles of the positive electrode, which suppresses electrolyte oxidation and further prevents the attack of electrolyte by-products on particles of the positive electrode.

In certain embodiments, the improved performance of a battery of the present disclosure includes at least one of the following: a retained capacity of the battery of less than 10% reduction after 80 cycles according to the Cycle-Store Test of Full Cell; and a coulombic efficiency of the battery of greater than 0.998% after 16 cycles according to the Full Cell Test by Ultra High-Precision Charger.

Rechargeable lithium ion batteries of the present disclosure may be used in electronic devices, such as a portable computer, a tablet, a mobile phone, an electrically powered vehicle, and an energy storage system. In certain embodiments, the electronic device is an electrically powered vehicle.

Positive Electrodes

Positive electrodes of the rechargeable lithium ion batteries of the present disclosure include coated particles, wherein each coated particle includes a core and a coating disposed thereon. The coating layer may be an annealed coating layer. The surface layer is delimited by an outer surface and an inner interface, the inner interface being in contact with the core.

In certain embodiments, the particles (i.e., powder) have an average particle size (i.e., the longest dimension of a particle, such as the diameter of a spherical particle) of at least 2 microns, or at least 3 microns, or at least 5 microns, or at least 10 microns. In certain embodiments, the particles (i.e., powder) have an average particle size of up to 20 microns, or up to 15 microns.

In certain embodiments of the positive electrodes, the core consists of Li (lithium), M, and O (oxygen), and the coating includes Li, M, O, and $Al_2O_3$.

In the positive electrodes, M is $(Ni_z(Ni_{1/2}Mn_{1/2})_yCo_x)_{1-k}A_k$ (formula I).

In certain embodiments of formula I, $0.20 \leq z \leq 0.50$, or $0.35 \leq z \leq 0.45$.

In certain embodiments of formula I, $0.17 \leq x \leq 0.30$, or $0.18 \leq x \leq 0.22$.

In certain embodiments of formula I, $0.35 \leq y \leq 0.75$, or $0.4 \leq y \leq 0.7$, or $0.4 \leq y \leq 0.6$.

In certain embodiments of formula I, $0 < k \leq 0.1$, or $0.005 < k \leq 0.013$.

In certain embodiments of formula I, $x+y+z=1$.

In certain embodiments of formula I, A is selected from Al (aluminum), Mg (magnesium), Zr (zirconium), W (tungsten), Ti (titanium), Cr (chromium), V (vanadium), Nb (niobium), B (boron), and Ca (calcium), and combinations thereof. In certain embodiments, A includes Al and optionally at least one additional metal dopant selected from Mg, Zr, W, Ti, Cr, V, Nb, B, and Ca, and combinations thereof. In certain embodiments of formula I, A is Al.

In certain embodiments of formula I, A is provided as a dopant, such as a metal oxide. That is, the source of the doping metal is preferably a metal oxide dopant, such as $Al_2O_3$, $TiO_2$, MgO, $WO_3$, $ZrO_2$, $Cr_2O_3$, $V_2O_5$, and mixtures thereof. The preferred source of Al is a nanometric alumina powder, for example, fumed alumina. The alumina can be obtained by precipitation, spray drying, milling, etc. In one embodiment, fumed alumina or surface-treated fumed alumina is used. Fumed alumina nanoparticles are produced in high temperature hydrogen-air flames and are used in several applications that involve products of everyday use.

In the core (or in the entire particle) of the particles of the positive electrodes, the Li and M are present in a molar ratio of Li to M of at least 0.95 (or at least 1.00) and no greater than 1.10.

In certain embodiments, the core of the particles of the positive electrodes includes at least 0.3 mol-% Al, the Al content being determined by X-ray photoelectron spectroscopy (XPS). In certain embodiments, the core of the particles of the positive electrodes includes up to 3 mol-% Al, the Al content being determined by XPS.

In certain embodiments, the positive electrode core material includes $Li_{1.01}(Ni_{0.4}(Ni_{1/2}Mn_{1/2})_{0.4}Co_{0.2})_{0.996}Al_{0.004})_{0.99}O_2$.

In certain embodiments, the coating disposed on the particle core includes less than 10 wt-% $Al_2O_3$ (alumina), based on the weight of the coating.

In certain embodiments, the coating disposed on the particle core includes an oxide other than alumina in an amount of less than 2 wt-%, based on the weight of the coating. In certain embodiments, the coating disposed on the particle core includes an oxide other than alumina selected from CaO, $TiO_2$, MgO, $WO_3$, $ZrO_2$, $Cr_2O_3$, $V_2O_5$, and combinations thereof.

In certain embodiments, the particle coating includes an inner interface in contact with the core and an outer surface, wherein the outer surface includes at least 4 mol-% Al, or at least 6 mol-% Al. In certain embodiments, the outer surface includes up to 10 mol-% Al.

In certain embodiments, the surface layer has an Al content that increases continuously from the Al content of the core at the inner interface to more than 4 mol-% at the outer surface, or at least 6 mol-%. The concentration of the different elements in the surface layer and the outer part of the core can be determined using X-ray photoelectron spectroscopy (XPS).

In certain embodiments, the positive electrode coating has a total thickness of at least 50 nanometers (nm). In certain embodiments, the positive electrode coating has a total thickness of up to 400 nm.

Negative Electrodes

Commercially available negative electrodes may be used in the batteries of the present disclosure.

Exemplary negative electrodes of the rechargeable lithium ion batteries of the present disclosure include graphite, sodium carboxy-methyl-cellulose, and styrene-butadiene-rubber. In certain embodiments, the negative electrode further includes carbon black (e.g., in an amount of greater than 0 wt-% and up to 3 wt-%).

For example, a mixture of graphite, CMC (carboxy-methyl-cellulose-sodium), and SBR (styrenebutadiene-rubber), in a mass ratio of 96/2/2 may be used.

Nonaqueous Liquid Electrolytes

Nonaqueous liquid electrolytes of the rechargeable lithium ion batteries of the present disclosure include a lithium salt, a nonaqueous solvent, and an additive mixture.

In certain embodiments, the lithium salt includes $LiPF_6$, $LiBF_4$, $LiN(CF_3SO_2)_2$, LiFSi, or combinations thereof. In certain embodiments, the concentration of the salt in the nonaqueous solvent may be at least 0.5 Molar (M). In certain embodiments, the concentration of the salt in the nonaqueous solvent may be up to 2.5 M. In certain embodiments, the concentration of the salt in the nonaqueous solvent is about 1 molar.

In certain embodiments, the nonaqueous solvent includes a carbonate solvent. In certain embodiments, the carbonate solvent is selected from ethylene carbonate, ethyl methyl carbonate, diethyl carbonate, dimethyl carbonate, propylene carbonate, and combinations thereof. In certain embodiments, the nonaqueous solvent includes a mixture of solvents. For example, the nonaqueous solvent is a mixture of ethylene carbonate (EC) and ethylmethylcarbonate (EMC) in a weight ratio of 3:7.

In certain embodiments, the nonaqueous solvent includes an ester solvent. In certain embodiments, the ester solvent is selected from methyl propanoate, ethyl propanoate, butyl propanoate, methyl acetate, ethyl acetate, and combinations thereof.

In certain embodiments, the additive mixture includes: prop-1-ene-1,3-sultone; at least one compound selected from tris(trimethylsilyl)phosphite, tris(trimethylsilyl)phosphate, tri-allyl phosphate, and combinations thereof; and at least one compound selected from methylene methanedisulfonate, 1,3,2-dioxathiolane-2,2-dioxide, and combinations thereof.

In certain embodiments, the additive mixture includes prop-1-ene-1,3-sultone, tris(trimethylsilyl)phosphite, and methylene methanedisulfonate.

In certain embodiments, the additive mixture includes at least 0.3 wt-%, or at least 1.0 wt-%, or at least 1.5 wt-%, prop-1-ene-1,3-sultone. In certain embodiments, the additive mixture includes up to 3 wt-%, or up to 2.5 wt-%, or up to 2.0 wt-%, prop-1-ene-1,3-sultone. In certain embodiments, the additive mixture includes 2.0 wt-% prop-1-ene-1,3-sultone.

In certain embodiments, the additive mixture includes at least 0.1 wt-%, or at least 0.5 wt-%, of at least one compound selected from tris(trimethylsilyl)phosphite, tris(trimethylsilyl)phosphate, tri-allyl phosphate, and combinations thereof. In certain embodiments, the additive mixture includes up to 3 wt-%, or up to 2.5 wt-%, or up to 1.5 wt-%, of at least one compound selected from tris(trimethylsilyl)phosphite, tris(trimethylsilyl)phosphate, tri-allyl phosphate, and combinations thereof. In certain embodiments, the additive mixture includes 1 wt-% of at least one compound selected from tris(trimethylsilyl)phosphite, tris(trimethylsilyl)phosphate, tri-allyl phosphate, and combinations thereof.

In certain embodiments, the additive mixture includes at least 0.1 wt-%, or at least 0.5 wt-%, of at least one compound selected from methylene methanedisulfonate, 1,3,2-dioxathiolane-2,2-dioxide, and combinations thereof. In certain embodiments, the additive mixture includes up to 3 wt-%, or up to 2.5 wt-%, or up to 1.5 wt-%, of at least one compound selected from methylene methanedisulfonate, 1,3,2-dioxathiolane-2,2-dioxide, and combinations thereof. In certain embodiments, the additive mixture includes 1 wt-% of at least one compound selected from methylene methanedisulfonate, 1,3,2-dioxathiolane-2,2-dioxide, and combinations thereof.

In certain embodiments, the additive mixture includes: 2 wt-% prop-1-ene-1,3-sultone; 1 wt-% of at least one compound selected from tris(trimethylsilyl)phosphite, tris(trimethylsilyl)phosphate, tri-allyl phosphate, and combinations thereof; and 1 wt-% of at least one compound selected from methylene methanedisulfonate, 1,3,2-dioxathiolane-2,2-dioxide, and combinations thereof.

Full Cells

The particles used in the positive electrodes of the present disclosure, also referred to as surface-modified high-Ni cathode powders, may be used in a full cell configuration and may be evaluated at elevated temperature (HT) in cycling tests. The HT cycling test of a full cell of the present disclosure shows excellent cycling stability and good storage properties. For example, compared with full cells using bare NMC622 as cathode material (i.e., particles in the positive eledtrode), full cells containing Al-treated NMC622 cathode material have a much better cycling life during cycling in the voltage range of 2.8 V to 4.4 V at room temperature, especially with the electrolyte disclosed herein.

Full cells normally present bad cyclability if there is moisture exposure in the coating step of full cell making. The utilization of the electrolyte disclosed herein can advantageously recover the performance of cells, even if the preparation of the full cell is not perfect. That is, the electrolyte disclosed herein can enhance the quality of cells containing a positive electrode disclosed herein, made under less stringent manufacturing conditions.

Accordingly, the present disclosure provides rechargeable lithium ion batteries that can be stably and repeatedly used for automotive application.

Exemplary Embodiments

Embodiment 1 is a rechargeable lithium ion battery comprising:
a positive electrode comprising coated particles, wherein each coated particle comprises a core and a coating disposed thereon, wherein the core consists of Li, M, and O, and the coating comprises Li, M, O, and $Al_2O_3$;
wherein:
M is $(Ni_z(Ni_{1/2}Mn_{1/2})_yCo_x)_{1-k}A_k$;
$0.15 \leq z \leq 0.50$;
$0.17 \leq x \leq 0.30$;
$0.35 \leq y \leq 0.75$;
$0 \leq k \leq 0.1$;
$x+y+z=1$; and
A comprises Al and optionally at least one additional metal dopant selected from Mg, Zr, W, Ti, Cr, V, Nb, B, and Ca, and combinations thereof and
wherein the Li and M are present in the core in a molar ratio of Li to M of at least 0.95 and no greater than 1.10;
a negative electrode; and
a nonaqueous liquid electrolyte comprising:
a lithium salt;
a nonaqueous solvent; and
an additive mixture comprising:
prop-1-ene-1,3-sultone;
at least one compound selected from tris(trimethylsilyl)phosphite, tris(trimethylsilyl)phosphate, tri-allyl phosphate, and combinations thereof and
at least one compound selected from methylene methanedisulfonate, 1,3,2-dioxathiolane-2,2-dioxide, and combinations thereof.

Embodiment 2 is the battery of embodiment 1 wherein A is Al.

Embodiment 3 is the battery of embodiment 1 or 2 wherein A is provided as a metal oxide dopant.

Embodiment 4 is the battery of embodiment 3 wherein the metal oxide dopant comprises fumed alumina.

Embodiment 5 is the battery of any of embodiments 1 through 4 wherein the core comprises at least 0.3 mol-% Al, the Al content being determined by XPS.

Embodiment 6 is the battery of any of embodiments 1 through 5 wherein the core comprises up to 3 mol-% Al, the Al content being determined by XPS.

Embodiment 7 is the battery of any of embodiments 1 through 6 wherein the particle coating comprises an inner interface in contact with the core and an outer surface, wherein the outer surface comprises at least 4 mol-% Al.

Embodiment 8 is the battery of embodiment 7 wherein the outer surface comprises at least 6 mol-% Al.

Embodiment 9 is the battery of embodiment 7 or 8 wherein the outer surface comprises up to 10 mol-% Al.

Embodiment 10 is the battery of any of embodiments 1 through 9 wherein the particle coating comprises less than 10 wt-% $Al_2O_3$, based on the weight of the particle coating.

Embodiment 11 is the battery of any of embodiments 1 through 10 wherein the particle coating further comprises an oxide other than alumina selected from CaO, $TiO_2$, MgO, $WO_3$, $ZrO_2$, $Cr_2O_3$, $V_2O_5$, and combinations thereof.

Embodiment 12 is the battery of embodiment 11 wherein the particle coating comprises less than 2 wt-% of the oxide other than alumina, based on the weight of the particle coating.

Embodiment 13 is the battery of any of embodiments 1 through 12 wherein:
$0.15 \leq z \leq 0.50$;
$0.17 \leq x \leq 0.30$;
$0.35 \leq y \leq 0.75$;
$0.005 < k \leq 0.013$; and
the Li and M are present in a molar ratio of Li to M in the core of at least 1.00 and no greater than 1.10.

Embodiment 14 is the battery of embodiment 13 wherein the positive electrode core material comprises $Li_{1.01}(Ni_{1/2}Mn_{1/2})_{0.4}Co_{0.2})_{0.996}Al_{0.004})_{0.99}O_2$.

Embodiment 15 is the battery of any of embodiments 1 through 14 wherein the additive mixture comprises at least 0.3 wt-% prop-1-ene-1,3-sultone.

Embodiment 16 is the battery of any of embodiments 1 through 15 wherein the additive mixture comprises up to 3 wt-% prop-1-ene-1,3-sultone.

Embodiment 17 is the battery of embodiment 15 or 16 wherein the additive mixture comprises 1.0 wt-% to 2.5 wt-% prop-1-ene-1,3-sultone.

Embodiment 18 is the battery of embodiment 17 wherein the additive mixture comprises 1.5 wt-% to 2.0 wt-% prop-1-ene-1,3-sultone.

Embodiment 19 is the battery of any of embodiments 1 through 18 wherein the additive mixture comprises at least 0.1 wt-% (or at least 0.5 wt-%) of at least one compound selected from tris(trimethylsilyl)phosphite, tris(trimethylsilyl)phosphate, tri-allyl phosphate, and combinations thereof.

Embodiment 20 is the battery of any of embodiments 1 through 19 wherein the additive mixture comprises up to 3 wt-% of at least one compound selected from tris(trimethylsilyl)phosphite, tris(trimethylsilyl)phosphate, tri-allyl phosphate, and combinations thereof.

Embodiment 21 is the battery of embodiment 19 or 20 wherein the additive mixture comprises up to 2.5 wt-% of at least one compound selected from tris(trimethylsilyl)phosphite, tris(trimethylsilyl)phosphate, tri-allyl phosphate, and combinations thereof.

Embodiment 22 is the battery of embodiment 21 wherein the additive mixture comprises up to 1.5 wt-% of at least one compound selected from tris(trimethylsilyl)phosphite, tris(trimethylsilyl)phosphate, tri-allyl phosphate, and combinations thereof.

Embodiment 23 is the battery of any of embodiments 1 through 22 wherein the additive mixture comprises at least 0.1 wt-% (or at least 0.5 wt-%) of at least one compound selected from methylene methanedisulfonate, 1,3,2-dioxathiolane-2,2-dioxide, and combinations thereof.

Embodiment 24 is the battery of any of embodiments 1 through 23 wherein the additive mixture comprises up to 3 wt-% of at least one compound selected from methylene methanedisulfonate, 1,3,2-dioxathiolane-2,2-dioxide, and combinations thereof.

Embodiment 25 is the battery of embodiment 23 or 24 wherein the additive mixture comprises up to 2.5 wt-% of at least one compound selected from methylene methanedisulfonate, 1,3,2-dioxathiolane-2,2-dioxide, and combinations thereof.

Embodiment 26 is the battery of embodiment 25 wherein the additive mixture comprises up to 1.5 wt-% of at least one compound selected from methylene methanedisulfonate, 1,3,2-dioxathiolane-2,2-dioxide, and combinations thereof.

Embodiment 27 is the battery of any of embodiments 15 through 26 wherein the additive mixture comprises: 2 wt-% prop-1-ene-1,3-sultone; 1 wt-% of at least one compound selected from tris(trimethylsilyl)phosphite, tris(trimethylsilyl)phosphate, tri-allyl phosphate, and combinations thereof; and 1 wt-% of at least one compound selected from methylene methanedisulfonate, 1,3,2-dioxathiolane-2,2-dioxide, and combinations thereof.

Embodiment 28 is the battery of any of embodiments 1 through 27 wherein the additive mixture comprises: prop-1-ene-1,3-sultone; tris(trimethylsilyl)phosphite; and methylene methanedisulfonate.

Embodiment 29 is the battery of any of embodiments 1 through 28 wherein the positive electrode coating has a total thickness of at least 50 nanometers (nm).

Embodiment 30 is the battery of any of embodiments 1 through 29 wherein the positive electrode coating has a total thickness of up to 400 nm.

Embodiment 31 is the battery of any of embodiments 1 through 30 wherein the negative electrode comprises graphite, sodium carboxy-methyl-cellulose, and styrene-butadiene-rubber.

Embodiment 32 is the battery of embodiment 31 wherein the negative electrode further comprises carbon black (e.g., in an amount of greater than 0 wt-% and up to 3 wt-%).

Embodiment 33 is the battery of any of embodiments 1 through 32 wherein the lithium salt comprises $LiPF_6$, $LiBF_4$, $LiN(CF_3SO_2)_2$, LiFSi, or combinations thereof.

Embodiment 34 is the battery of any of embodiments 1 through 33 wherein the nonaqueous solvent comprises a carbonate solvent.

Embodiment 35 is the battery of embodiment 34 wherein the carbonate solvent is selected from ethylene carbonate, ethyl methyl carbonate, diethyl carbonate, dimethyl carbonate, propylene carbonate, and combinations thereof.

Embodiment 36 is the battery of embodiment 34 or 35 wherein the nonaqueous solvent further comprises an ester solvent.

Embodiment 37 is the battery of embodiment 36 wherein the ester solvent is selected from methyl propanoate, ethyl propanoate, butyl propanoate, methyl acetate, ethyl acetate, and combinations thereof.

Embodiment 38 is the battery of any of embodiments 1 through 37 which demonstrates less than 10% reduction in retained capacity after 80 cycles according to the Cycle-Store Test of Full Cell.

Embodiment 39 is the battery of any of embodiments 1 through 38 which demonstrates a coulombic efficiency of greater than 0.998% after 16 cycles according to the Full Cell Test by Ultra High-Precision Charger.

Embodiment 40 is an electronic device comprising a rechargeable lithium ion battery of any of embodiments 1 through 39.

Embodiment 41 is the electronic device of embodiment 40 which is a portable computer, a tablet, a mobile phone, an electrically powered vehicle, and an energy storage system.

Embodiment 42 is the electronic device of embodiment 41 which is an electrically powered vehicle.

Embodiment 43 is a method of improving the performance of a rechargeable lithium ion battery, the method comprising:
providing coated particles, each of which comprises a core and a coating disposed thereon, wherein the core consists of Li, M, and O, and the coating comprises Li, M, O, and $Al_2O_3$;
wherein:
M is $(Ni_z(Ni_{1/2}Mn_{1/2})_yCo_x)_{1-k}A_k$;
$0.15 \leq z \leq 0.50$;
$0.17 \leq x \leq 0.30$;
$0.35 \leq y \leq 0.75$;
$0 < k \leq 0.1$;
$x+y+z=1$; and
A comprises Al and optionally at least one additional metal dopant selected from Mg, Zr, W, Ti, Cr, V, Nb, B, and Ca, and combinations thereof; and
wherein the Li and M are present in the core (or in the particle) in a molar ratio of Li to M of at least 0.95 and no greater than 1.10;

forming the coated paricles into a positive electrode;
providing a negative electrode;
providing a nonaqueous liquid electrolyte comprising:
a lithium salt;
a nonaqueous solvent; and
an additive mixture comprising:
prop-1-ene-1,3-sultone;
at least one compound selected from tris(trimethylsilyl) phosphite, tris(trimethylsilyl)phosphate, tri-allyl phosphate, and combinations thereof; and
at least one compound selected from methylene methanedisulfonate, 1,3,2-dioxathiolane-2,2-dioxide, and combinations thereof; and
combining the positive electrode, the negative electrode, and the electrolyte into a rechargeable lithium ion battery.

Embodiment 44 is the method of embodiment 43 wherein improving the performance of the battery comprises at least one of the following:
a retained capacity of the battery of less than 10% reduction after 80 cycles according to the Cycle-Store Test of Full Cell; and
a coulombic efficiency of the battery of greater than 0.998% after 16 cycles according to the Full Cell Test by Ultra High-Precision Charger.

Embodiment 45 is the method of embodiment 43 or 44 wherein A is Al.

Embodiment 46 is the method of any of embodiments 43 through 45 wherein A is provided as a metal oxide dopant.

Embodiment 47 is the method of embodiment 46 wherein the metal oxide dopant comprises fumed alumina.

Embodiment 48 is the method of any of embodiments 43 through 47 wherein the core comprises at least 0.3 mol-% Al, the Al content being determined by XPS.

Embodiment 49 is the method of any of embodiments 43 through 48 wherein the core comprises up to 3 mol-% Al, the Al content being determined by XPS.

Embodiment 50 is the method of any of embodiments 43 through 49 wherein the particle coating comprises an inner interface in contact with the core and an outer surface, wherein the outer surface comprises at least 4 mol-% Al.

Embodiment 51 is the method of embodiment 50 wherein the outer surface comprises at least 6 mol-% Al.

Embodiment 52 is the method of embodiment 50 or 51 wherein the outer surface comprises up to 10 mol-% Al.

Embodiment 53 is the method of any of embodiments 43 through 52 wherein the particle coating comprises less than 10 wt-% $Al_2O_3$, based on the weight of the particle coating.

Embodiment 54 is the method of any of embodiments 43 through 53 wherein the particle coating further comprises an oxide other than alumina selected from CaO, $TiO_2$, MgO, $WO_3$, $ZrO_2$, $Cr_2O_3$, $V_2O_5$, and combinations thereof.

Embodiment 55 is the method of embodiment 54 wherein the particle coating comprises less than 2 wt-% of the oxide other than alumina, based on the weight of the particle coating.

Embodiment 56 is the method of any of embodiments 43 through 55 wherein:
$0.35 \leq z \leq 0.45$;
$0.18 \leq x \leq 0.22$;
$0.35 \leq y \leq 0.75$;
$0.005 < k \leq 0.013$; and
the Li and M are present in the core in a molar ratio of Li to M of at least 1.00 and no greater than 1.10.

Embodiment 57 is the method of embodiment 56 wherein the positive electrode core material comprises $Li_{1.01}(Ni_{0.4}(Ni_{1/2}Mn_{1/2})_{0.4}Co_{0.2})_{0.996}Al_{0.004})_{0.99}O_2$.

Embodiment 58 is the method of any of embodiments 43 through 57 wherein the additive mixture comprises at least 0.3 wt-% prop-1-ene-1,3-sultone.

Embodiment 59 is the method of any of embodiments 43 through 58 wherein the additive mixture comprises up to 3 wt-% prop-1-ene-1,3-sultone.

Embodiment 60 is the method of embodiment 58 or 59 wherein the additive mixture comprises 1.0 wt-% to 2.5 wt-% prop-1-ene-1,3-sultone.

Embodiment 61 is the method of embodiment 60 wherein the additive mixture comprises 1.5 wt-% to 2.0 wt-% prop-1-ene-1,3-sultone.

Embodiment 62 is the method of any of embodiments 43 through 61 wherein the additive mixture comprises at least 0.1 wt-% (or at least 0.5 wt-%) of at least one compound selected from tris(trimethylsilyl)phosphite, tris(trimethylsilyl)phosphate, tri-allyl phosphate, and combinations thereof.

Embodiment 63 is the method of any of embodiments 43 through 62 wherein the additive mixture comprises up to 3 wt-% of at least one compound selected from tris(trimethylsilyl)phosphite, tris(trimethylsilyl)phosphate, tri-allyl phosphate, and combinations thereof.

Embodiment 64 is the method of embodiment 62 or 63 wherein the additive mixture comprises up to 2.5 wt-% of at least one compound selected from tris(trimethylsilyl)phosphite, tris(trimethylsilyl)phosphate, tri-allyl phosphate, and combinations thereof.

Embodiment 65 is the method of embodiment 64 wherein the additive mixture comprises up to 1.5 wt-% of at least one compound selected from tris(trimethylsilyl)phosphite, tris(trimethylsilyl)phosphate, tri-allyl phosphate, and combinations thereof.

Embodiment 66 is the method of any of embodiments 43 through 65 wherein the additive mixture comprises at least 0.1 wt-% (or at least 0.5 wt-%) of at least one compound selected from methylene methanedisulfonate, 1,3,2-dioxathiolane-2,2-dioxide, and combinations thereof.

Embodiment 67 is the method of any of embodiments 43 through 66 wherein the additive mixture comprises up to 3 wt-% of at least one compound selected from methylene methanedisulfonate, 1,3,2-dioxathiolane-2,2-dioxide, and combinations thereof.

Embodiment 68 is the method of embodiment 66 or 67 wherein the additive mixture comprises up to 2.5 wt-% of at least one compound selected from methylene methanedisulfonate, 1,3,2-dioxathiolane-2,2-dioxide, and combinations thereof.

Embodiment 69 is the method of embodiment 68 wherein the additive mixture comprises up to 1.5 wt-% of at least one compound selected from methylene methanedisulfonate, 1,3,2-dioxathiolane-2,2-dioxide, and combinations thereof.

Embodiment 70 is the method of any of embodiments 58 through 69 wherein the additive mixture comprises: 2 wt-% prop-1-ene-1,3-sultone; 1 wt-% of at least one compound selected from tris(trimethylsilyl)phosphite, tris(trimethylsilyl)phosphate, tri-allyl phosphate, and combinations thereof; and 1 wt-% of at least one compound selected from methylene methanedisulfonate, 1,3,2-dioxathiolane-2,2-dioxide, and combinations thereof.

Embodiment 71 is the method of any of embodiments 43 through 70 wherein the additive mixture comprises: prop-1-ene-1,3-sultone; tris(trimethylsilyl)phosphite; and methylene methanedisulfonate.

Embodiment 72 is the method of any of embodiments 43 through 71 wherein the positive electrode coating has a total thickness of at least 50 nm.

Embodiment 73 is the method of any of embodiments 43 through 72 wherein the positive electrode coating has a total thickness of up to 400 nm.

Embodiment 74 is the method of any of embodiments 43 through 73 wherein the negative electrode comprises graphite, sodium carboxy-methyl-cellulose, and styrene-butadiene-rubber.

Embodiment 75 is the method of embodiment 74 wherein the negative electrode further comprises carbon black (e.g., in an amount of greater than 0 wt-% and up to 3 wt-%).

Embodiment 76 is the method of any of embodiments 43 through 75 wherein the lithium salt comprises $LiPF_6$, $LiBF_4$, $LiN(CF_3SO_2)_2$, LiFSi, or combinations thereof.

Embodiment 77 is the method of any of embodiments 43 through 76 wherein the nonaqueous solvent comprises a carbonate solvent.

Embodiment 78 is the method of embodiment 77 wherein the carbonate solvent is selected from ethylene carbonate, ethyl methyl carbonate, diethyl carbonate, dimethyl carbonate, propylene carbonate, and combinations thereof.

Embodiment 79 is the method of embodiment 77 or 78 wherein the nonaqueous solvent further comprises an ester solvent.

Embodiment 80 is the method of embodiment 79 wherein the ester solvent is selected from methyl propanoate, ethyl propanoate, butyl propanoate, methyl acetate, ethyl acetate, and combinations thereof.

Embodiment 81 is the method of any of embodiments 43 through 80 which demonstrates less than 10% reduction in retained capacity after 80 cycles according to the Cycle-Store Test of Full Cell.

Embodiment 82 is the method of any of embodiments 43 through 81 which demonstrates a coulombic efficiency of greater than 0.998% after 16 cycles according to the Full Cell Test by Ultra High-Precision Charger.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Preparation of Coated and Uncoated NMC622

(a) Preparation of NMC622 core: lithium carbonate and a mixed Ni—Mn—Co oxy-hydroxide were homogeneously blended in a vertical single-shaft mixer by a dry powder mixing process. The blend ratio was targeted to obtain $Li_{1.01}(Ni_{0.4}(Ni_{1/2}Mn_{1/2})_{0.4}Co_{0.2})_{0.99}O_2$, which can be easily verified by an analysis technique such as inductively coupled plasma (ICP) mass spectroscopy. The mixture was then sintered in a tunnel furnace in an oxidizing atmosphere. The sintering temperature was at least 900° C. and the dwell time was approximately 10 hours (h). Dry air was used as the oxidizing gas. After sintering, the sample was milled in a grinding machine to a mean particle size of around 12 micrometers (μm).

(b) Al doping and alumina coating: NMC 622 powder from step (a) was mixed with 0.2 percent by weight (wt-%) of fumed alumina ($Al_2O_3$) nanopowder. After homogeneously mixing, the mixture was sintered at 700° C. for around 5 h. Dry air was used as an oxidizing gas. It can be verified that after the sintering step at this temperature, Al is doped in the lithium metal oxide (core), and XPS measurements show a gradient that is established at the surface with increasing Al content, whereas the surface itself is covered with a very thin $Al_2O_3$ coating. After this step the material could be represented by the overall formula A positive electrode material of $Li_{1.01}((Ni_{0.4}(Ni_{1/2}Mn_{1/2})_{0.4}Co_{0.2})_{0.99}O_2$ is manufactured through the process (a) without any further treatment. This is referred to as "Bare-NMC622" or "uncoated NMC622" hereafter.

Figure 1:
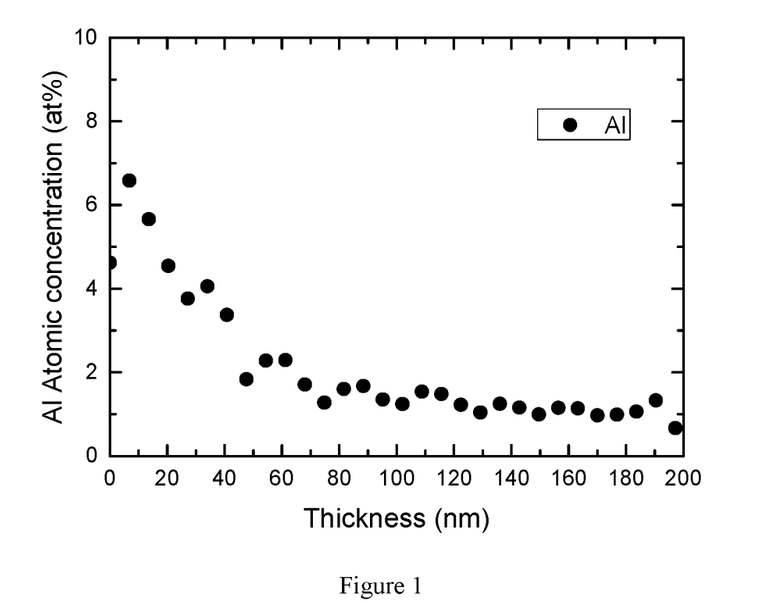
FIG. 1 shows the X-ray photoelectron spectroscopy (XPS) analysis of the surface of an exemplary cathode material ("Al-NMC622" material).

A positive electrode material of $Li_{1.01}((Ni_{0.4}(Ni_{1/2}Mn_{1/2})_{0.4}Co_{0.2})_{0.996}Al_{0.004})_{0.99}O_2$ was manufactured using the process steps (a) and (b). This is referred to as "Al-NMC622" or "coated NMC622" hereafter. The XPS analysis of the surface of the "Al-NMC622" material is shown in FIG. 1, where the gradient, surface, and core content of Al are clearly visible.

Preparation of Full Cell

Exemplary 220 mAh pouch-type cells were prepared as follows: the positive electrode active material powder including SUPER P carbon black (commercially available from Imerys Graphite & Carbon, Switzerland), and KS-6 graphite (commercially available from Timcal) as positive electrode conductive agents, and polyvinylidene fluoride (PVDF 1710, commercially available from Kureha Corp., Japan) as a positive electrode binder were added to NMP (N-methyl-2-pyrrolidone) as a dispersion medium so that the mass ratio of the positive electrode active material powder, the positive electrode conductive agent, and the positive electrode binder was set at 92/3/1/4. Thereafter, the mixture was kneaded to prepare a positive electrode mixture slurry. The resulting positive electrode mixture slurry was then applied onto both sides of a positive electrode current collector, made of a 15-µm thick aluminum foil. The width of the applied area was 26 millimeters (mm), while the short length was 163 mm and the long length was 200 mm. Typical cathode active material loading weight was 12.3 milligrams per square centimeter (mg/cm$^2$). The electrode was then dried and calendared using a pressure of 100 killogram force (Kgf). In addition, an aluminum plate serving as a positive electrode current collector tab was arc-welded to an end portion of the positive electrode.

Commercially available negative electrodes were used. In short, a mixture of graphite, CMC (carboxy-methyl-cellulose-sodium) and SBR (styrenebutadiene-rubber), in a mass ratio of 96/2/2, was applied on both sides of a copper foil. A nickel plate serving as a negative electrode current collector tab was arc-welded to an end portion of the negative electrode. Typical cathode and anode discharge capacity ratio used for cell balancing was 0.75.

Nonaqueous electrolyte was prepared as described in each example. All electrolytes were prepared in an argon-filled glove box. All salts, solvents, and additives used were handled within the same glove box. Nothing was exposed to air at any time.

A sheet of the positive electrode, a sheet of the negative electrode, and a sheet of separator made of a 20-µm thick microporous polymer film (CELGARD 2320 commercially available from Celgard, Korea) interposed between them were spirally wound using a winding core rod in order to obtain a spirally-wound electrode assembly. The wounded electrode assembly was then put in an aluminum laminated pouch in an air-dry room.

Prior to electrolyte filling, cells were dried in a vacuum oven at 80° C. for 14 h. Then the cells were transferred immediately to an argon-filled glove box for filling and vacuum sealing.

Cell Volume Change Test During Formation of Full Cell

Cells were all treated as follows: cells were put in a 40° C. box and charged to 1.5 V, and held at that voltage for 24 h. They were then charged to 3.5 V at C/20. The cell volume change was then measured using Archimedes' Principle. The cell was then degassed. This is referred to as "Formation Step 1."

Cells were then charged to 4.4 V at C/20 after Formation Step 1 and held at 4.4 V for 1 h. They were then discharged to 3.8 V and held at that voltage until the current dropped below C/1000. The cell volume change was then measured using Archimedes' Principal. Cells were then degassed. This is referred as "Formation Step 2."

The cell volume was measured using Archimedes' Principle as follows: using cell designs comprising soft enclosures such as pouch cells allows the volume of gas produced during cell operation to be measured. The weight of the cells when submerged in water is measured before and after cycling. The weight of the cells is measured by suspending the cell underneath a balance (some balances are equipped with a weight sensor underneath its base) using a thin wire. The weight of the submerged cell will then be equal to the tension on the wire and measured by the balance. The difference in wire tension before and after cell operation is then directly proportional to the volume change of the cell following:

$$F = (m - \rho V)g \qquad (1)$$

$$\Delta V = \frac{-F_{final} + F_{initial}}{\rho g} \qquad (2)$$

where F is the tension on the wire, m is the mass of the cell, g is the gravitational acceleration, p is the density of the water, V is the volume of the cell, and the subscripts initial and final refer to before and after cell testing, respectively.

Moli Cycle-Store Test of Full Cell

Cycle-store testing was carried out using an E-One Moli Energy Canada computer controlled test station. In these experiments, cells were first charged to 4.4 V and discharged to 2.8 V twice with a C/20 current. Then the cells were charged to 4.4 V at C/5, left open circuit for 24 hours, and then discharged to 2.8 V at C/5. The second sequence was repeated many times. The testing was done at 40° C.

Full Cell Test by Ultra High-Precision Charger (UHPC)

In *Journal of the Electrochemical Society*, 160 (3) A521-A527 (2013) and *Journal of the Electrochemical Society*, 157, A196-A202 (2010), the ultra-precision charger (UHPC) at Dalhousie University is described. This UHPC was used for testing many of the cells. The UHPC can measure coulometric efficiency to an accuracy of ±0.00003. Cells were charged and discharged between 2.8 V and 4.4 V at C/20 and at 40° C. for 16 cycles while their coulombic efficiency was measured. NMC622-based full cells of the present disclosure were tested by this method.

CCCV Cycling Test of Full Cells

Cells were first discharged at C/20 to 2.8 V and then followed a charge-discharge cycle at C/20 between 4.4 V and 2.8 V. In the second step, the cells were charged at C/5 to 4.4 V, held at 4.4 V for 5 hours, and then discharged at C/5 to 2.8 V. The second sequence was repeated many times. The testing was done at 40° C.

XPS Test

In the various embodiments of the modified cathode powders, the thickness of the surface layer may be more than 50 nm and less than 400 nm. The thickness of the surface layer was determined by XPS measurement. A sputtering rate in SiO$_2$ of 6.0 nm/minute is applied to calculate the depth/thickness. The thickness here is obtained by the sputtering time multiplied by the (reference) sputtering rate in SiO$_2$. During the XPS measurement, it is difficult to obtain the sputtering rate of measured objectives. A typical way is to normalize the thickness by using a standard sputtering rate (in SiO$_2$ here) for all samples. Therefore, it is not necessarily true that the thickness calculated here is the same as could be obtained by other spectra methods, for example, Scanning Electron Microscopy (SEM). Known techniques such as ICP give the average composition of the powder. It is known that ICP gives a more accurate average measurement than XPS, however, for descriptions of the properties of the coating layer, such as element distribution with different layer thickness, XPS can provide accurate qualitative and quantitative data. Practically, the measurements are carried out in a Quantera SXM instrument from ULVAC-PHI (Q2) (Japan). The measurements are performed using monochromatic Al-Kα-radiation and a spot size of 100 μm scanning across an area of 1200×500 μm (High Sensitivity Mode). The measurement angle 0 is 45°; at this setting the information depth is approximately 7 nm. By means of wide-scan measurements the elements present at the surface are identified. Accurate narrow-scans are performed to determine the precise surface composition. Concentration—depth profiles are determined by alternating measurements and ion bombardment (Argon ions, Vi=4 kV, raster 3×3 mm, sputter rate in SiO$_2$ of 6.0 nm/minute).

Example 1: Coated NMC622 vs. Uncoated NMC622 Full Cells Made by Umicore

A 220-mAh pouch-type full cell was prepared following the description above in "Preparation of Full Cell," where cathode active material utilized "Al-NMC622" as prepared following the description above in "Preparation of Coated and Uncoated NMC622"; where the electrolyte comprising of 1M hexafluorophosphate (LiPF$_6$, "LPF", purity 99.94%, water content 14 ppm, BASF) dissolved in a mixture of ethylene carbonate ("EC", BASF) and ethylmethyl carbonate ("EMC", BASF) with a weight ratio of 3:7. This cell served as a control sample and is named cell 1.1a (electrolyte LPF+EC+EMC).

Another 220-mAh pouch-type full cell was prepared following the same procedure for cell 1.1a, with the addition of 2% vinylene carbonate (VC, purity>99.8%, water content<100 ppm, BASF). The cell is named cell 1.2a (electrolyte=LPF+EC+EMC+VC).

Another 220-mAh pouch-type full cell was prepared following the same procedure for cell 1.1a, with addition of 2% prop-1-ene-1,3-sultone ("PES", purity 98.20%, Lianchuang Medicinal Chemistry Co., Ltd., China). The cell is named cell 1.3a (electrolyte=LPF+EC+EMC+PES).

Another 220-mAh pouch-type full cell was prepared following the same procedure for cell 1.1a, with addition of 2% prop-1-ene-1,3-sultone ("PES", purity 98.20%, Lianchuang Medicinal Chemistry Co., Ltd., China), 1% tris(trimethylsilyl) phosphite (TTSPi, purity>95%, TCI America) and 1% methylene methanedisulfonate (MMDS, purity 98.70%, Guangzhou Tinci Co. Ltd., China; this additive composition is abbreviated as "PES211." The cell is named cell 1.4a (electrolyte=LPF+EC+EMC+PES+MMDS).

Another 220-mAh pouch-type full cell was prepared following the same procedure for cell 1.1a, with addition of 1% pyridine-boron trifluoride ("PBF", purity>99%, 3M Co., St. Paul, Minn.). The cell is named cell 1.5a (electrolyte=LPF+EC+EMC+PBF).

Cell 1.1a to cell 1.5a were prepared with changing the cathode active material from "Al-NMC622" to "Bare-NMC622" that was manufactured following the description in "Preparation of Coated and Uncoated NMC622" and are named cell 1.1b, cell 1.2b, cell 1.3b, cell 1.4b, and cell 1.5b, respectively.

Cell 1.1a to cell 1.5a and cell 1.1b to cell 1.5b were all analyzed following the steps in "Cell Volume Change Test During Formation of Full Cell," "Moli Cycle-Store Test of Full Cell" and "Full Cell Test by Ultra High-Precision Charger (UHPC)."

Figure 2:
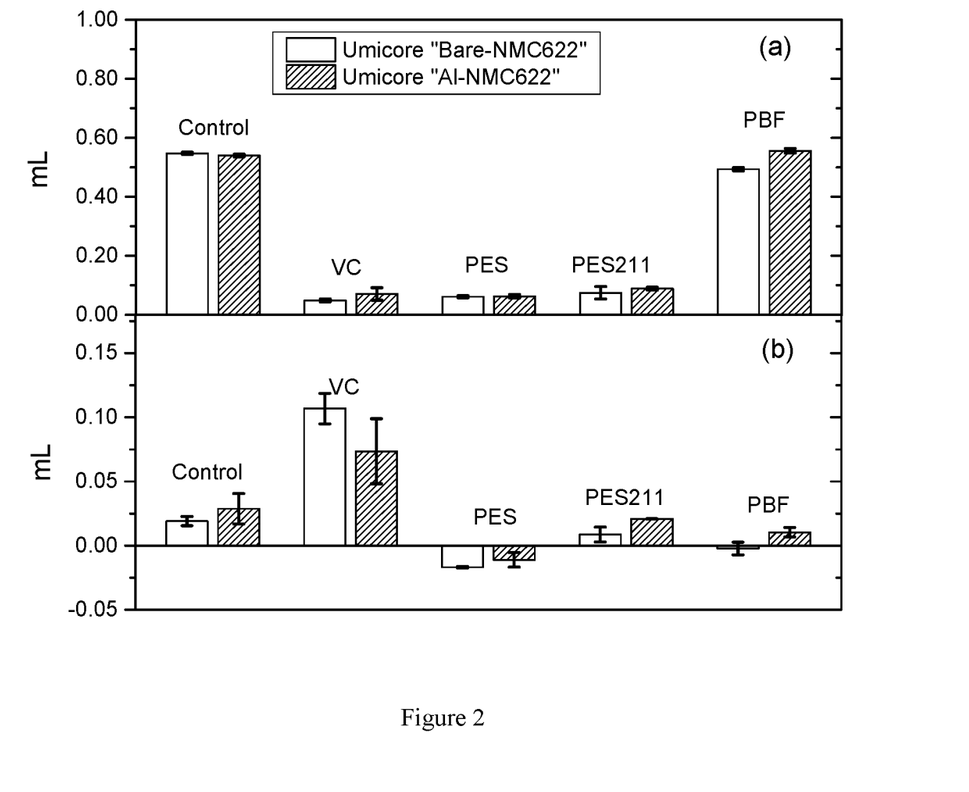
FIG. 2 shows the volume expansion of "Al-NMC622" cells and "Bare-NMC622"cells during formation steps 1 and 2.

FIG. 2 illustrates the expanded volume of cells described above during formation steps. In Formation Step1(a), the volume expansion of "Al-NMC622" cells are similar to the one of "Bare-NMC622" cells, while the volume expansion of cells depends on the electrolyte additive composition. Both control cells (cell 1.1a and 1.1b) and PBF additive-containing cells (cell 1.5a and 1.5b) possess large volume expansion, at the same time, the other cells have relatively small volume change. This indicates that VC, PES, and "PES211" additives can reduce gas generation of cells during Formation Step1. In Formation Step 2, all cells present comparable volume changes, except cell 1.2a and cell 1.2b, which contain 2% VC, showing relatively large volume expansion. Accordingly, among all electrolyte additives, PES and "PES211" reduce gas generation of "Al-NMC622" to "Bare-NMC622" cells during formation.

Figure 3:
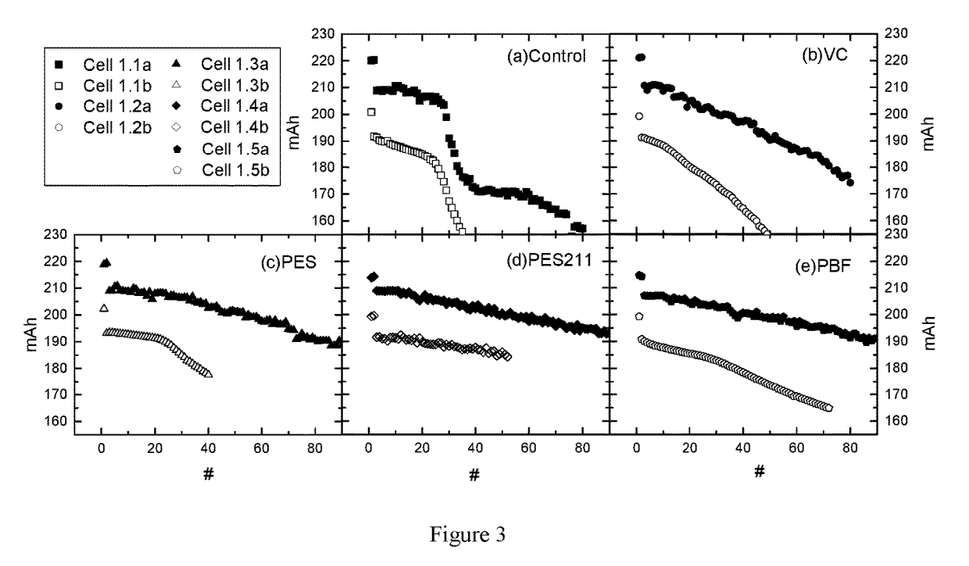
FIG. 3 shows the capacity retention of cell 1.1a to 1.5a and cell 1.1b to 1.5b during cycle-store test at 40° C.

FIG. 3 gives the retained capacity plots of cells described above in the Moli Cycle-Store Test. The y-axis represents the discharge capacity during cycling and x-axis represents the cycle number. Solid symbols represent the results of "Al-NMC622" cells while open symbols represent the results of "Bare-NMC622" cells. The results demonstrate that "Al-NMC622" cells perform better than "Bare-NMC622" cells in the cycling test. Thus, alumina coating and doping is beneficial to cycling stability of NMC622 cells.

Among all "Bare-NMC622" cells, cell 1.4b shows the best performance, which indicates that PES211 electrolyte additive improves the capacity of "Bare-NMC622" cells. Among all cells in FIG. 3, cells containing "PES211" additives possess the best cyclability. The cyclability of cell 1.4a and cell 1.4b are quite similar during 50 cycles, but the capacity of cell 1.4a is much higher than that of cell 1.4b. The retained capacity of cell 1.4a is much better than that of cell 1.1a, which is better when compared with cell 1.1b. Thus, it can be concluded that the combination of alumina coating and doping on NMC622 and the "PES211" additive mixture in the electrolyte has a synergetic effect on the capacity performance of full cells when testing at 4.4 V and high temperature.

Figure 4:
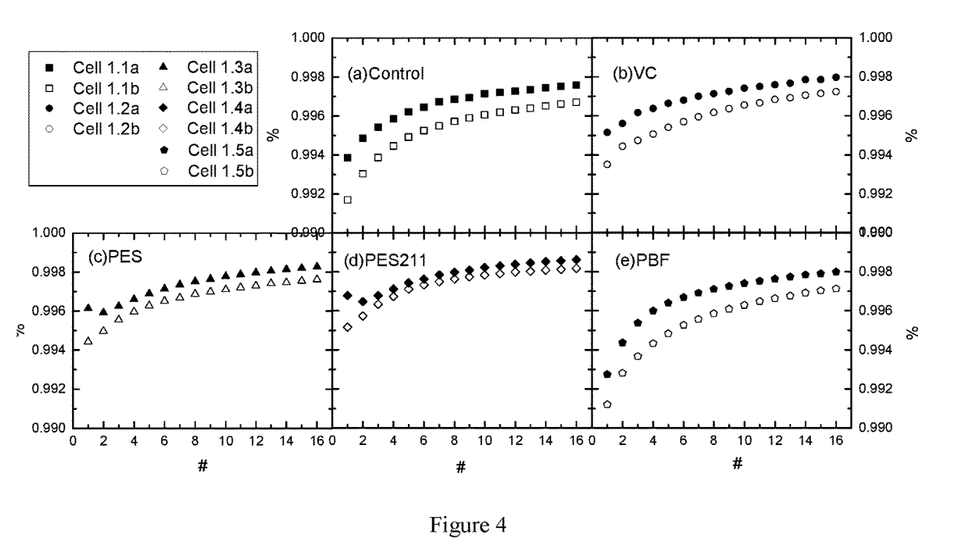
FIG. 4 shows the coulombic efficiency of cell 1.1a to 1.5a and cell 1.1b to 1.5b during UHPC test at 40° C.

FIG. 4 shows the results of UHPC tests as described in the "Full Cell Test by Ultra High-Precision Charger (UHPC)," which can give coulombic efficiency (abbreviated as CE) with high precision. In FIG. 4, the y-axis represents the coulombic efficiency and the x-axis represents the cycle number. The solid symbols represent the results of "Al-NMC622" cells while open symbols represent the results of "Bare-NMC622" cells. FIGS. 4(a) to 4(e) correspond to the cells with electrolyte additive of control, VC, PES, PES211, and PBF, respectively. For all electrolytes studied, control, the CE for "Al-NMC622" cells is higher than the CE of "Bare-NMC622" cells. Battery University (http://batteryuniversity.com/learn/article/what_causes_lithium_ion_to_die) and J. Electrochem. Soc. 160, A1451-A1456 (2013) show that cells with higher coulombic efficiency generally have longer calendar and cycle life than cells with lower coulombic efficiency. Therefore, the coating certainly imparts longer lifetime to NMC622 cells tested to 4.4 V. FIG. 4 also shows that cells with PES211 electrolyte have the highest CE among all the coated NMC622 cells and also among all the uncoated NMC622 cells. Therefore, cell with PES211 electrolyte and "Al-NMC622" is the best in the CE testing.

Example 2: Coated NMC622 Full Cells Made by Li-Fum Technology

This example will show that the PES211 electrolyte allows one to utilize "Al-NMC622" powder as a cathode active material in a full cell even if the battery making process is not perfect.

Cell 1.1a to cell 1.5a were prepared by Li-Fun Technology (Xinma Industry Zone, Golden Dragon Road, Tianyuan District, Zhuzhou City, Hunan Province, PRC, 412000, China), using the same cell compositions as described in "Example 1: Coated NMC622 vs. Uncoated NMC622 Full Cells." The obtained cells are named cell 2.1a to cell 2.5a, respectively.

Cell 2.1a to cell 2.5a were tested following the steps in "Cell Volume Change Test During formation of Full Cell" and "Moli Cycle-Store Test of Full Cell," and compared to cell 1.1a to cell 1.5a, which are made by Umicore. The cathode coatings made at Li-Fun Technology were coated in laboratory air so some moisture exposure of the materials was inevitable. By contrast, the cathode coatings made at Umicore were under humidity controlled conditions to avoid exposure of the materials to moisture. Cell making process in Umicore is a fully controlled pilot process.

Figure 5:
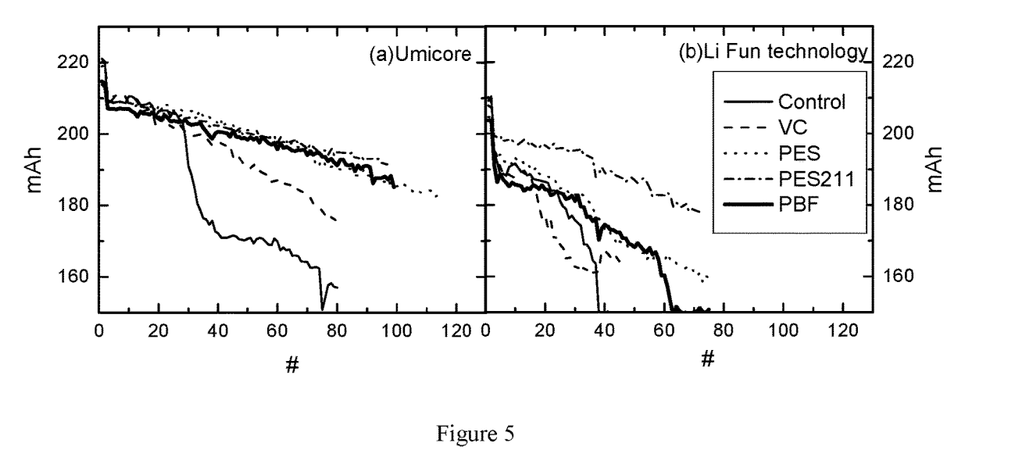
FIG. 5 shows the capacity retention of cell 1.1a to 1.5a and cell 2.1a to 2.5a during cycle-store test at 40° C.

FIG. 5 shows the discharge capacity versus the cycle number results during "Moli Cycle-Store Test of Full Cell" for "Al-NMC622" cells that were made at Umicore (a) and at Li-Fun Technology (b). In FIG. 5, it shows that cells with all electrolyte blends perform worse in the cells made at Li-Fun Technology than in the cells made at Umicore, except for the cells with PES211, which perform comparably. This shows that the additive blend PES211 can impart excellent behavior to coated NMC622 cells even under less than perfect manufacturing conditions.

Figure 6:
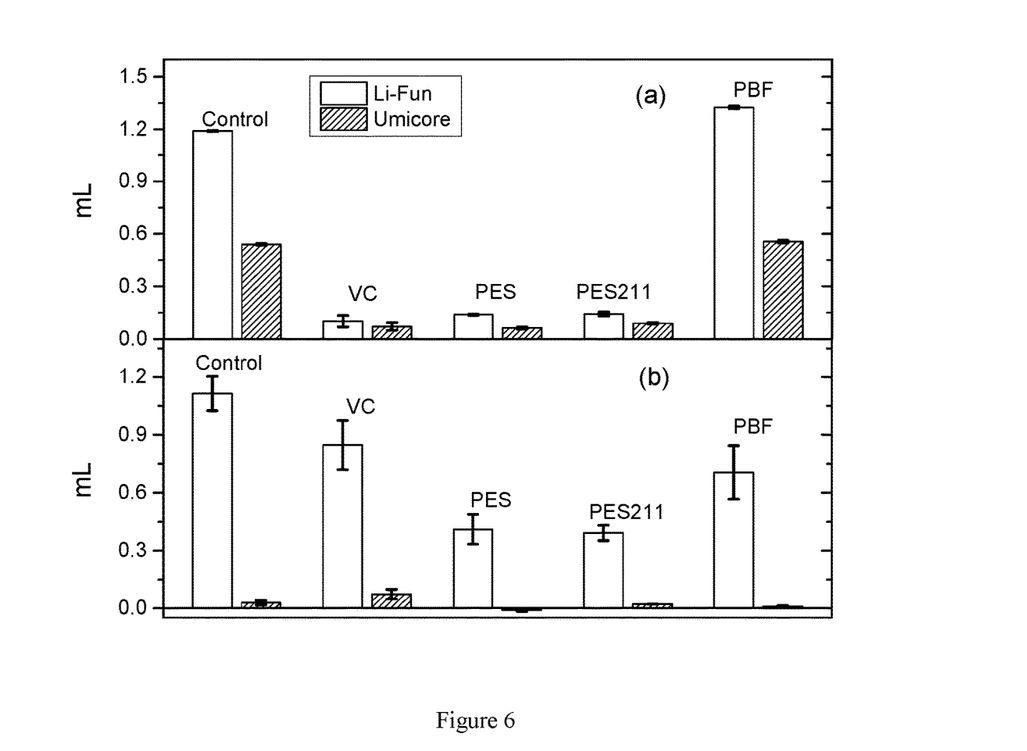
FIG. 6 shows the volume expansion of Umicore cells and Li-Fun cells during formation steps 1 and 2.

FIG. 6 shows the volume of gas generated in "Al-NMC622" cells that were made at Umicore and at Li-Fun Technology during Formation Steps 1 and 2 as described in "Cell Volume Change Test During Formation of Full Cell." Two cells were prepared for each electrolyte composition by Umicore and Li-Fun, separately. The columns show the average gas volume of two cells and error bar represents the standard derivation of two cells. In the Formation Step 1, the gas formation of Umicore cells and Li-Fun cells is scattered by electrolyte. Regardless of the manufacturer and manufacturing process, VC, PES, and PES211 cells all presents low-gas generation when compared with control and PBF cells. In Formation Step 2, cells made at Li-Fun Technology have more gas generation for all electrolyte compositions. It is believed this is due to the exposure to air during cathode production at Li-Fun Technology. Among all electrolyte compositions, PES and PES211 reduce the gas formation of cells made at Li-Fun Technology. This indicates that PES and PES211 can alleviate the negative impact on "Al-NMC622" cells when the battery making process is less than perfect.

Example 3: Coated NMC622 vs. Coated NMC541 Full Cells Made by Umicore

This example demonstrates that PES211 electrolyte additive mixture does not bring positive effect to improve the cyclability of coated NMC541 cells. Coated NMC541 powders are prepared by step (a) and (b) in "Preparation of Coated and Uncoated NMC622," with changing the target composition to $Li_{1.01}((Ni_{0.1}(Ni_{1/2}Mn_{1/2})_{0.8}Co_{0.1})_{0.996}Al_{0.004})_{0.99}O_2$. The coated NMC541 powders are named "Al-NMC541."

"Al-NMC541" based cells were made by Umicore using electrolytes of cell 1.1a to 1.5a in "Example 1: Coated NMC622 vs. Uncoated NMC622 Full Cells Made by Umicore." The obtained cell is named cell 3.1a to 3.5a, respectively.

Cell 3.1a to cell 3.5a were tested by "Cell Volume Change Test During formation of Full Cell," "Moli Cycle-Store Test of Full Cell," and "Full Cell Test by Ultra High-Precision Charger (UHPC)." The results are compared with the electrochemical performance of cell 1.1a to cell 1.5a.

Figure 7:
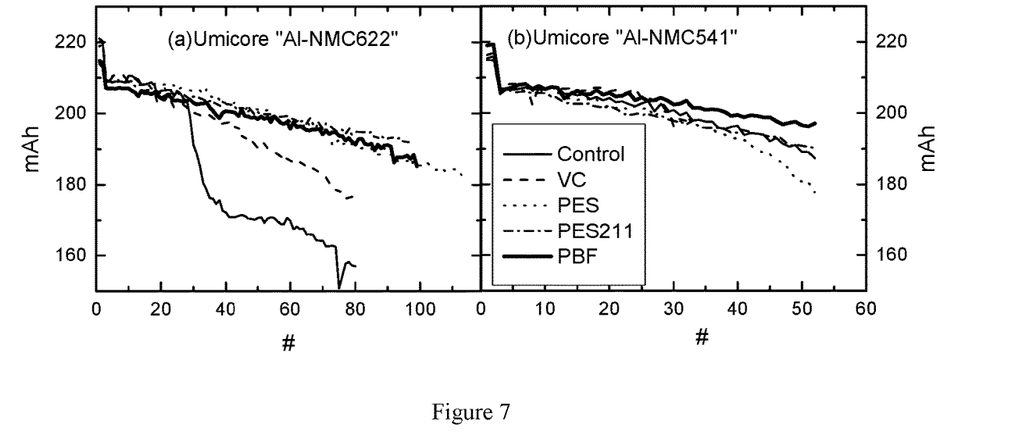
FIG. 7 shows the capacity retention of cell 1.1a to 1.5a and cell 3.1a to 3.5a during cycle-store test at 40° C.

FIG. 7 gives the cycle-store data for cell 1.1a to cell 1.5a and cell 3.1a to cell 3.5a. As noted above, "Al-NMC622" full cell has the best cyclability when cooperating with PES211 electrolyte additive. In the case of "Al-NMC541" cells, the cell with PES211 does not possess the best cycle life. FIG. 7b indicates that cells with control and VC electrolyte have better cycling performance when compared with other cells. This suggests that the there is no synergy between PES211 and "Al-NMC541" powders.

Figure 8:
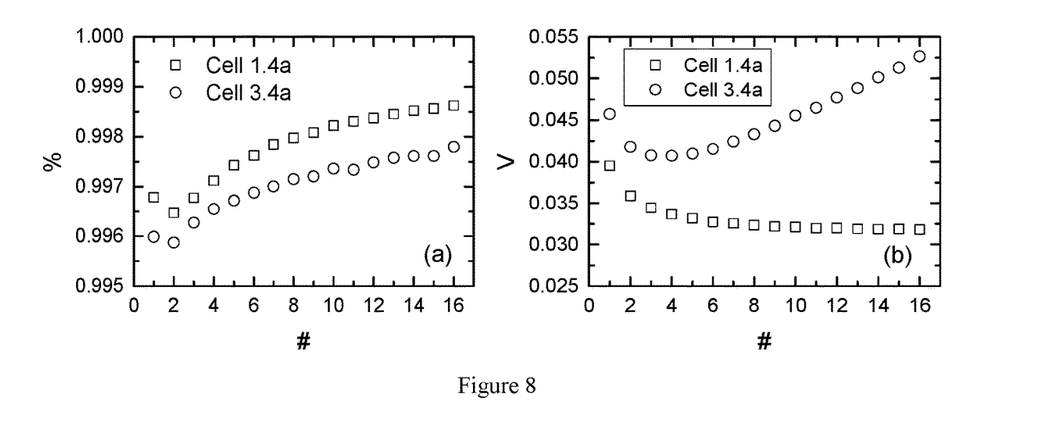
FIG. 8 shows (a) the coulombic efficiency of cell 1.4a and cell 3.4a during UHPC test at 40° C.; and (b) the average voltage difference between charge and discharge of cell 1.4a and cell 3.4a during UHPC test at 40° C.

FIG. 8 shows the results of cell 1.4a and cell 3.4a in "Full Cell Test by Ultra High-Precision Charger (UHPC)." FIG. 8a compares columbic efficiency, while FIG. 8b compares the average voltage difference between charge and discharge during each cycle for cell 1.4a and cell 3.4a. Both cells used PES211 electrolyte, but different NMC compositions. The coulombic efficiency for the coated NMC622 cells is higher than for the coated NMC541 cell. This suggests that PES211 has "special synergy" with coated NMC622.

FIG. 8b clearly shows that voltage difference of "Al-NMC541" cell rises with cycle number while that of "Al-NMC541" cell with coated NMC622 does not. This means that "Al-NMC541" has increasing impedance during cycling while "Al-NMC622" does not. This again demonstrates the special synergy between PES211 and "Al-NMC622".

Example 4: Coated NMC622 vs. Uncoated NMC7-1.5-1.5 Made by Umicore

This example demonstrates that PES211 electrolyte additive mixture has no positive effect on improving the cyclability of NMC7-1.5-1.5 cells.

Bare NMC7-1.5-1.5 powders comprising the formula of $Li_{1.01}(Ni_{0.6}(Ni_{1/2}Mn_{1/2})_{0.3}Co_{0.15})_{0.99}O_2$ were prepared in Umicore and are utilized as cathode active material to prepared full cells containing same electrolyte as used in cell 1.2a, cell 1.4a, and cell 1.5a in "Example 1: Coated NMC622 vs. Uncoated NMC622 Full Cells Made by Umicore." The obtained cells are named cell 4.1 to cell 4.3, respectively.

Cell 1.2a, cell 1.4a, and cell 1.5a, as well as cell 4.1 to cell 4.3 were tested by "CCCV Cycling Test of Full Cells."

Figure 9:
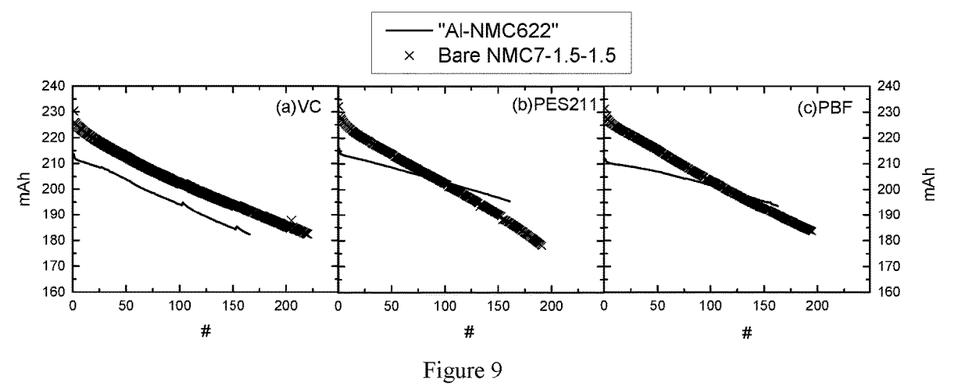
FIG. 9 shows the capacity retention of cell 1.2a, 1.4a and 1.5a, as well as cell 4.1 to 4.3 during CCCV cycling test at 40° C.

FIG. 9 shows the CCCV cycling results. Among cells containing bare NMC7-1.5-1.5 material, cell with PES211 shows the most rapid capacity fading, so that PES211 shows no benefit on capacity retention of bare NMC7-1.5-1.5 cell. It also observed that cell 4.2 has much worse cyclability when compared to cell 1.4a. Thus, unlike the case of coated NMC622, PES211 additives do not improve the capacity performance of bare NMC7-1.5-1.5 based full cells.

According to the above discussion and comparison, it is demonstrated that PES211-based electrolyte system is highly compatible with "Al-NMC 622" in the aspect of HT-cycling at high voltage. Rechargeable lithium ion batteries based on such design are promises to be stable during high voltage operation for long periods of time.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A rechargeable lithium ion battery comprising:
   a positive electrode comprising coated particles, wherein each particle comprises a core and a coating disposed thereon, wherein the core consists of Li, M, and O, and the coating comprises Li, M, O, and $Al_2O_3$;
   wherein:
   M is $(Ni_z(Ni_{1/2}Mn_{1/2})_yCo_x)_{1-k}A_k$;
   $0.35 \leq z \leq 0.45$;
   $0.18 \leq x \leq 0.22$;
   $0.4 \leq y \leq 0.6$;
   $0.005 \leq k \leq 0.013$;
   $x+y+z=1$; and
   A comprises Al and optionally at least one additional metal dopant
   selected from Mg, Zr, W, Ti, Cr, V, Nb, B, and Ca, and combinations thereof; and
   wherein the Li and M are present in the core in a molar ratio of Li to M of at least 0.95 and no greater than 1.10;
   a negative electrode; and
   a nonaqueous liquid electrolyte comprising:
      a lithium salt;
      a nonaqueous solvent; and
      an additive mixture comprising, by weight of the nonaqueous liquid electrolyte:
         0.3 wt-% to 3 wt-% prop-1-ene-1,3-sultone;
         0.1 wt-% to 3 wt-% tris(trimethylsilyl)phosphite; and
         0.1 wt-% to 3 wt-% methylene methanedisulfonate.

2. The battery of claim 1 wherein A is Al.

3. The battery of claim 1 wherein the core comprises at least 0.3 mol-% and up to 3 mol-% Al relative to a total amount of metal content, the Al content being determined by XPS.

4. The battery of claim 1 wherein the particle coating comprises an inner interface in contact with the core and an outer surface, wherein the outer surface comprises at least 4 mol-% Al relative to a total amount of metal content.

5. The battery of claim 4 wherein the outer surface comprises at least 6 mol-% Al and up to 10 mol-% Al relative to a total amount of metal content.

6. The battery of claim 1 wherein the coating further comprises an oxide other than alumina selected from CaO, $TiO_2$, MgO, $WO_3$, $ZrO_2$, $Cr_2O_3$, $V_2O_5$, and combinations thereof.

7. The battery of claim 1 wherein
   the Li and M are present in the core in a molar ratio of Li to M of at least 1.00 and no greater than 1.10.

8. The battery of claim 1 wherein the additive mixture comprises at least 0.1 wt-% and up to 3 wt-% by weight of the nonaqueous liquid electrolyte of at least one compound selected from tris(trimethylsilyl)phosphate, tri-allyl phosphate, and combinations thereof.

9. The battery of claim 1 wherein the additive mixture comprises at least 0.1 wt-% and up to 3 wt-% by weight of the nonaqueous liquid electrolyte of 1,3,2-dioxathiolane-2,2-dioxide.

10. The battery of claim 1 wherein the coating has a total thickness of up to 400 nm.

11. The battery of claim 1 wherein the negative electrode comprises graphite, sodium carboxy-methyl-cellulose, and styrene-butadiene-rubber.

12. The battery of claim 1 wherein the nonaqueous solvent comprises a carbonate solvent.

13. The battery of claim 12 wherein the nonaqueous solvent further comprises an ester solvent.

14. The battery of claim 1 which demonstrates less than 10% reduction in retained capacity after 80 cycles according to the Cycle-Store Test of Full Cell.

15. The battery of claim 1 which demonstrates a coulombic efficiency of greater than 0.998% after 16 cycles according to the Full Cell Test by Ultra High-Precision Charger.

16. An electronic device comprising a rechargeable lithium ion battery of claim 1.

17. A method of improving the performance of a rechargeable lithium ion battery, the method comprising:
   providing coated particles, each of which comprises a core and a coating disposed thereon, wherein the core consists of Li, M, and O, and the coating comprises Li, M, O, and $Al_2O_3$;
   wherein:
   M is $(Ni_z(Ni_{1/2}Mn_{1/2})_yCo_x)_{1-k}A_k$;
   $0.35 \leq z \leq 0.45$;
   $0.18 \leq x \leq 0.22$;
   $0.4 \leq y \leq 0.6$;
   $0.005 \leq k \leq 0.013$;
   $x+y+z=1$; and
   A comprises Al and optionally at least one additional metal dopant
   selected from Mg, Zr, W, Ti, Cr, V, Nb, B, and Ca, and combinations thereof; and
   wherein the Li and M are present in the core in a molar ratio of Li to M of at least 0.95 and no greater than 1.10;
   forming the coated particles into a positive electrode;
   providing a negative electrode;
   providing a nonaqueous liquid electrolyte comprising:
      a lithium salt;
      a nonaqueous solvent; and
      an additive mixture comprising, by weight of the nonaqueous liquid electrolyte:
         0.3 wt-% to 3 wt-% prop-1-ene-1,3-sultone;
         0.1 wt-% to 3 wt-% tris(trimethylsilyl)phosphite; and
         0.1 wt-% to 3 wt-% methylene methanedisulfonate; and
   forming a rechargeable lithium ion battery comprising the positive electrode, negative electrode, and electrolyte.

18. The method of claim 17 wherein improving the performance of the battery results in a battery having at least one of the following:
   a retained capacity of less than 10% reduction after 80 cycles according to the Cycle-Store Test of Full Cell; and
   a coulombic efficiency of greater than 0.998% after 16 cycles according to the Full Cell Test by Ultra High-Precision Charger.

* * * * *

UNITED STATES PATENT AND TRADEMARK OFFICE
CERTIFICATE OF CORRECTION

PATENT NO. : 11,217,817 B2
APPLICATION NO. : 16/303081
DATED : January 4, 2022
INVENTOR(S) : Jeffrey R. Dahn et al.

Page 1 of 1

It is certified that error appears in the above-identified patent and that said Letters Patent is hereby corrected as shown below:

On the Title Page

Item (57) In the Abstract, 'Al2O3' should read --$Al_2O_3$--.

Item (57) In the Abstract, '0<k<0.1' should read --$0<k\leq0.1$--.

In the Claims

In Claim 1 Line 27, '$0.005\leq k\leq0.013$' should read --$0.005<k\leq0.013$--.

In Claim 1 Line 30, the word 'dopant' should be immediately followed by 'selected' without a paragraph break.

In Claim 7 Line 61, the word 'wherein' should be immediately followed by 'the' without a paragraph break.

In Claim 17 Line 34, '$0.005\leq k\leq0.013$' should read --$0.005<k\leq0.013$--.

In Claim 17 Line 38, the word 'dopant' should be immediately followed by 'selected' without a paragraph break.

Signed and Sealed this
Twenty-seventh Day of December, 2022

Katherine Kelly Vidal
*Director of the United States Patent and Trademark Office*